United States Patent
Strenge et al.

(10) Patent No.: US 9,292,549 B2
(45) Date of Patent: Mar. 22, 2016

(54) METHOD AND SYSTEM FOR INDEX SERIALIZATION

(75) Inventors: Martin Strenge, Nussloch (DE); Gerd G. Forstmann, Nussloch (DE)

(73) Assignee: SAP SE, Walldorf (DE)

(*) Notice: Subject to any disclaimer, the term of this patent is extended or adjusted under 35 U.S.C. 154(b) by 1386 days.

(21) Appl. No.: 12/341,814

(22) Filed: Dec. 22, 2008

(65) Prior Publication Data

US 2010/0161668 A1  Jun. 24, 2010

(51) Int. Cl.
  *G06F 17/30* (2006.01)
(52) U.S. Cl.
  CPC .... *G06F 17/30312* (2013.01); *G06F 17/30569* (2013.01)
(58) Field of Classification Search
  USPC .......................................................... 707/791
  See application file for complete search history.

(56) References Cited

U.S. PATENT DOCUMENTS

| | | | | |
|---|---|---|---|---|
| 5,706,506 A | * | 1/1998 | Jensen et al. | |
| 5,809,507 A | * | 9/1998 | Cavanaugh, III | |
| 5,944,781 A | * | 8/1999 | Murray | 709/202 |
| 5,974,421 A | * | 10/1999 | Krishnaswamy et al. | |
| 6,154,747 A | * | 11/2000 | Hunt | |
| 6,477,580 B1 | * | 11/2002 | Bowman-Amuah | 709/231 |
| 7,404,186 B2 | * | 7/2008 | Massarenti | 719/311 |
| 2004/0059759 A1 | * | 3/2004 | Doan et al. | 707/205 |
| 2005/0166140 A1 | * | 7/2005 | Cai et al. | 715/513 |

OTHER PUBLICATIONS

Martin Elsman, "Type-Specialized Serialization with Sharing", Feb. 2004, IT University of Copenhagen, pp. 1-9.*

* cited by examiner

*Primary Examiner* — Albert Phillips, III
(74) *Attorney, Agent, or Firm* — Schwegman Lundberg & Woessner, P.A.

(57) ABSTRACT

A method and system for index serialization are described. A data structure containing objects using globally unique identifier (GUID) strings for their identification is indexed by creating a unique key object for each GUID. A master lookup table from GUID to key object is created along with a master table for each element type and a number of non-master tables for the other element type attributes. These element type tables are accessed using the key objects. The tables may then be serialized and deserialized.

20 Claims, 13 Drawing Sheets

METHOD AND SYSTEM FOR INDEX SERIALIZATION

TECHNICAL FIELD

This application relates to the field of serializing data structures.

BACKGROUND

Serialization is the process of converting an element in memory into a sequence of bits so that it can be stored (such as in a file or a buffer) or transmitted across a network. When the resulting series of bits is reread according to the serialization format, it can be used to create a semantically identical clone of the original element.

The problem with serializing a linked data structure is in storing pointer references. When the operating system attempts to restore the serialized data, it will place elements in currently unused sections of memory, which are extremely unlikely to be the same sections the elements occupied when the data was stored. Therefore, those references to specific locations in memory will no longer be valid.

The common solution to this problem is known as pointer swizzling. When a pointer is unswizzled, it is replaced by a position-independent symbol in the serialization process. Swizzling, the opposite function, is the conversion of the position-independent symbol back to a direct pointer reference during deserialization.

BRIEF DESCRIPTION OF DRAWINGS

Embodiments of the present invention are illustrated by way of example and not limitation in the figures of the accompanying drawings, in which like reference numbers indicate similar elements.

DETAILED DESCRIPTION

Figure 1:
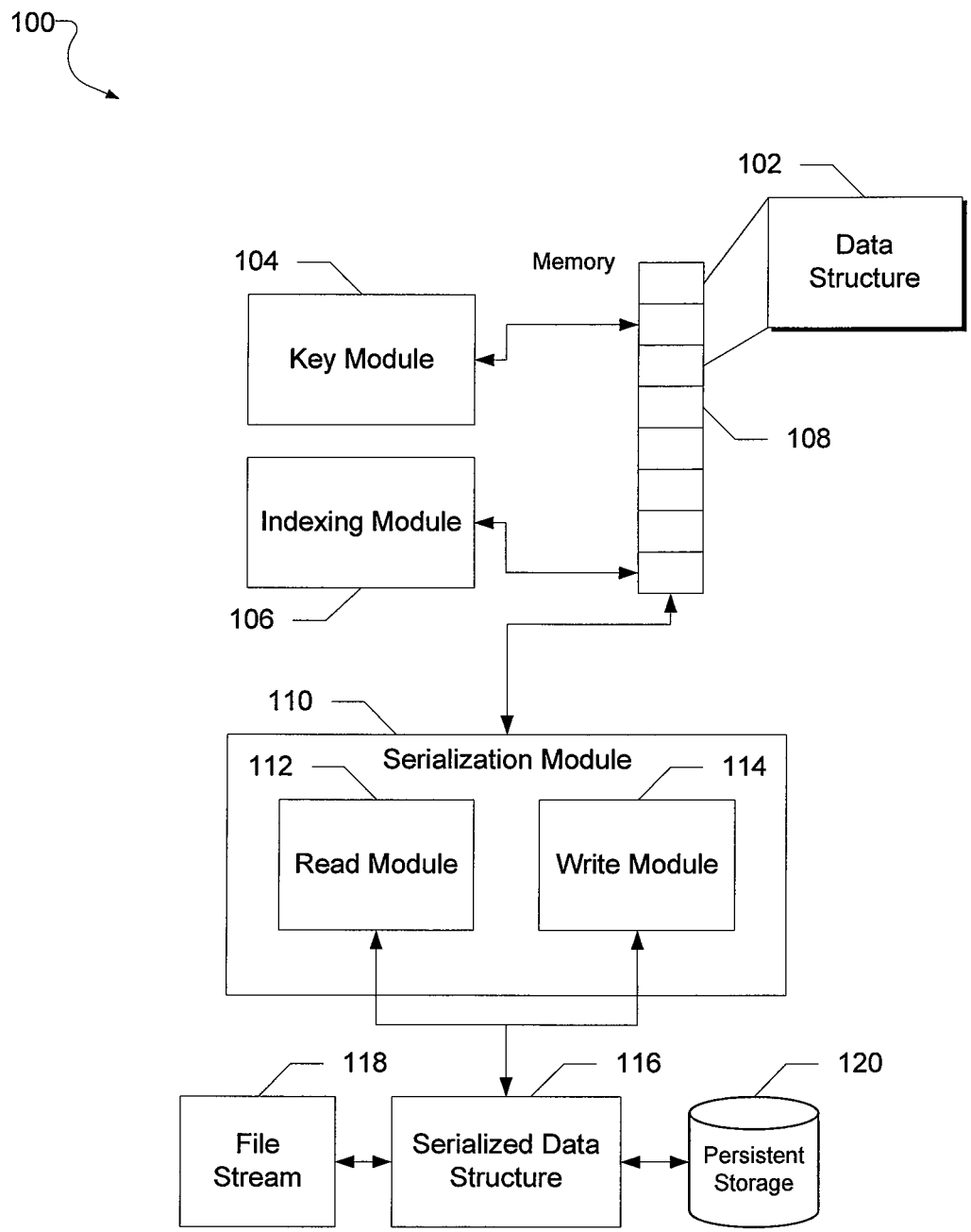
FIG. 1 is a block diagram of a system within which index serialization may be implemented, according to some example embodiments.

In the following description, for purposes of explanation, numerous specific details are set forth in order to provide a thorough understanding of some example embodiments. It will be evident, however, to one skilled in the art that the present invention may be practiced without these specific details.

Some example embodiments enable elements in linked data structures (e.g., graphs) to be serialized and deserialized quickly and efficiently by referencing the elements through unique key objects, instead of identification strings. More specifically, a unique key object is created for each existing globally unique identifier (GUID) in the data structure which represents the GUID, and each element references the unique key objects for all contained GUIDs. Elements do not have direct pointers to other elements; instead, the elements link via the key objects, and elements are stored in multiple tables by their key objects. The key objects themselves are treated like elements and are stored in a master table that is accessed by the GUIDs. Elements may be structures from functional programming languages, objects from object-oriented programming languages, or any equivalent container of data and/or code.

In one example embodiment, a key module creates key objects, which each represent a GUID associated with the elements to be serialized. A first table (e.g., a hash table in some embodiments) for indexing the key objects based on their GUIDs and a number of secondary tables for indexing the elements based on the key objects are created. A serialization module then serializes the tables.

According to some example embodiments, serializing the first table comprises calculating a size representing an amount of memory used by the first table, and then writing the size and content of the first table to a stream or persistent storage.

Serializing the secondary tables includes calculating a size representing an amount of memory used for each secondary table, designating a master table for each element type that exists in the data structure, and writing the size and non-null content of each master table to a stream or persistent storage. For each non-master secondary table, the size is written; for each element in the table, the index in the corresponding element master table is determined and written along with the index of the element in the non-master table.

In one example embodiment, a system to load the serialized data comprises a serialization module to allocate memory for a new master table equal to the size of the serialized master table and to allocate memory for new secondary tables equal to the sizes of the serialized secondary tables. The system further comprises a read module to read an element record and an index pair from the serialized data. The read modules creates an element in memory for each element record in the serialized data where the index pair includes a master table index and an index into one of the secondary tables. Finally, the system comprises an index module to create a reference to the element in the new master table at the master table index and to set the value of the index into the secondary table equal to the value contained in the master table at the master table index.

The result of implementing a serializable index in this way results in each key object and element only existing once. Therefore, comparing two keys or elements can be done by pointer equality, instead of comparing the GUIDs. Furthermore, memory consumption is heavily reduced since each GUID occurs at most once. Without redundancy, the size of the serialized index is smaller and therefore there is less data to read and write from a slow persistent store or across a slow network.

Further details regarding the various example embodiments described above will now be discussed with reference to the figures accompanying the present specification.

FIG. 1 is a block diagram illustrating a computer system 100, within which index serialization, according to some example embodiments, may be provided. The computer system 100 includes a key module 104 for creating unique key objects in memory 108. Each of these key objects represents a GUID from the data structure 102 in memory 108. An indexing module 106 creates the tables necessary to index the key objects and elements, and a serialization module 110 is operable to serialize and deserialize the data structure 102 and indices. The serialization module 110 includes a read module 112 to deserialize the serialized data structure 116 and input it into memory 108 and a write module 114 to serialize the data structure 102 from memory 108 to a serialized data structure 116. The serialized data structure 116 may be written to or read from a file stream 118 or persistent storage 120, such as a hard disk.

Figure 2:
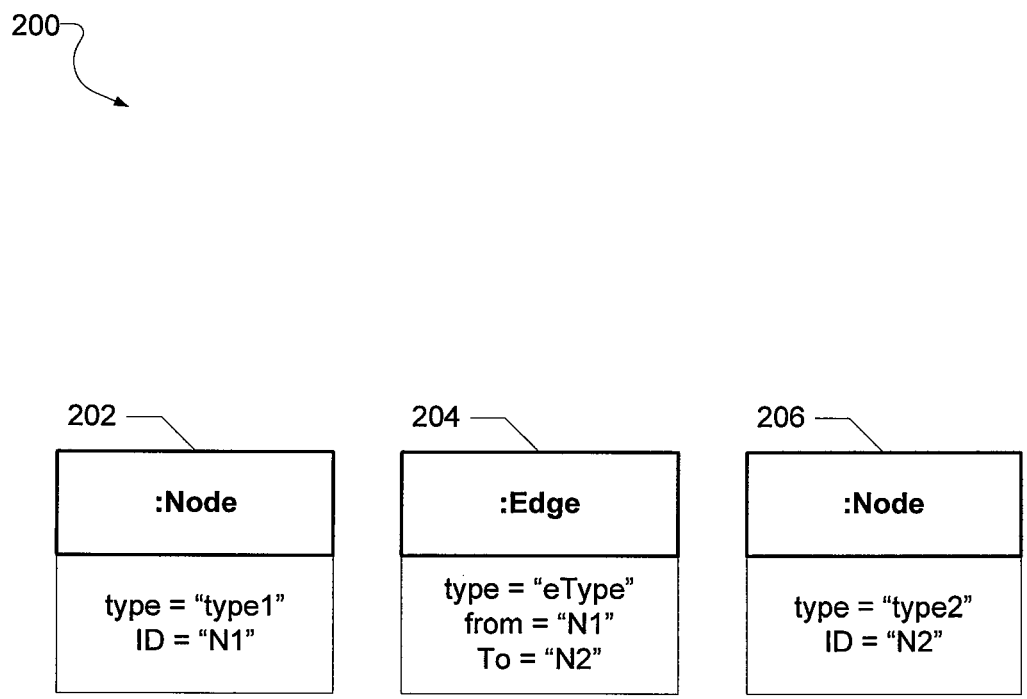
FIG. 2 is a block diagram illustrating two node elements and one edge element that links both nodes by their globally unique identifier (GUID) strings.

FIG. 2 is a block diagram 200 illustrating a first node 202, a second node 206, and one edge element 204 that links both nodes by their GUID strings. The first node 202 contains two identifiers: "N1" for its ID attribute and "type1" for its type attribute. The second node 206 has an ID of "N2" and a type of "type2." The edge 204 links the two nodes with from and to identifiers referencing "N1" and "N2."

Figure 3:
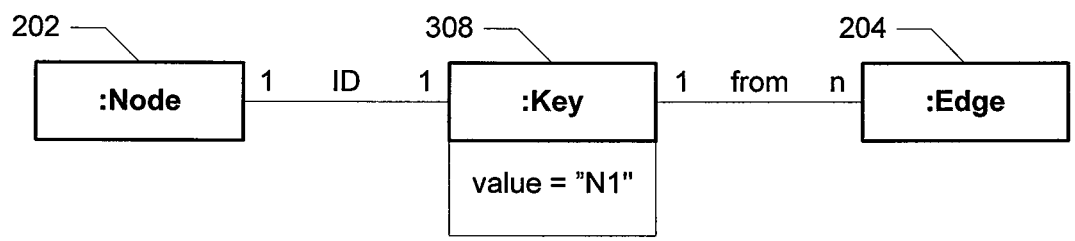
FIG. 3 is a block diagram illustrating node and edge elements referencing unique key objects, according to some example embodiments.
Figure 3:
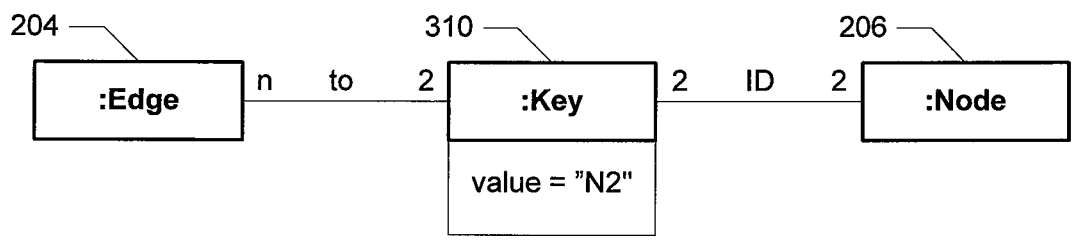

In the block diagram 300 shown in FIG. 3, both nodes 202 and 206 and the edge 204 reference unique key objects 308 and 310 instead of GUID strings. The first node 202 no longer has a pointer directly to edge 204; instead, its pointer has been changed to reference the first key object 308, which uniquely identifies the GUID "N1" in the data structure 102. Similarly, the second node 206 no longer points to edge 204—it points to the second key object 310 which uniquely identifies the GUID "N2" in the data structure 102. The edge 204 points to both the first key object 308 and the second key object 310.

Figure 4:
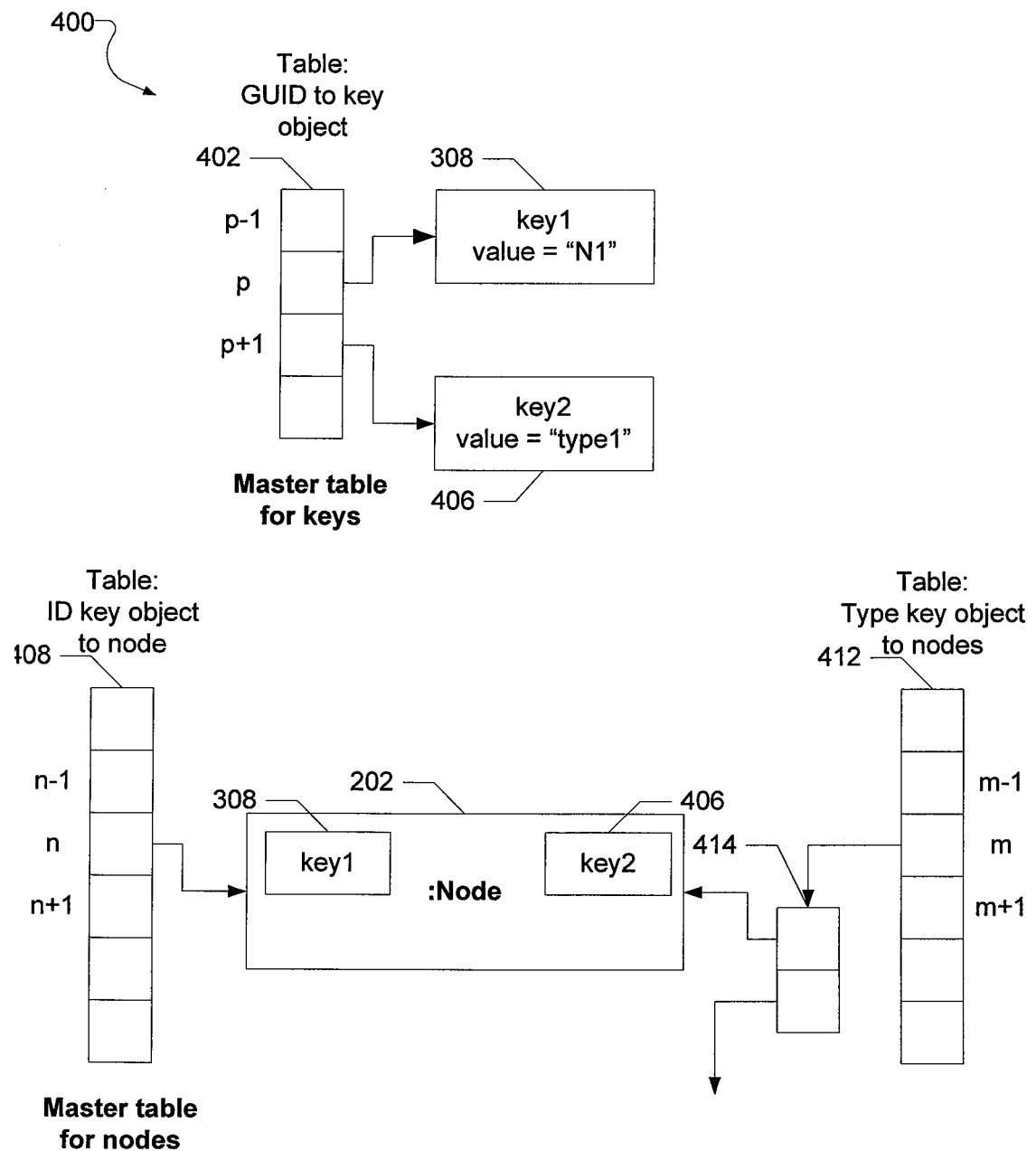
FIG. 4 is a block diagram illustrating index serialization, according to some example embodiments.

FIG. 4 is a block diagram 400 illustrating index serialization, according to some example embodiments. The first key object 308 with value "N1" has been indexed into a GUID to key object table 402, which allows key objects to be retrieved using a GUID. This is the master table for keys. In this example, the GUID to key object table 402 is a hash table, and the output of a hash function using the GUID "N1" as input is "p"—an index in the master table of keys 402. The first node 202 also references a key2 406 containing the GUID "type1," which is indexed at position p+1 in the GUID to key object table 402.

The first node 202 may be accessed by either key object using the master table for nodes 408 or the non-master table for type key objects to nodes 412. In this example, using the first key object 308 (an ID key) retrieved from the GUID to key object table 402 as input to a hash function results in a value of "n." This represents the index in the ID key object to node table where the first node 202 is located. Alternatively, the first node 202 may be retrieved by first using its type attribute value "type1" to retrieve key2 406 from the GUID to key object table 402. Next, key2 406 is used as input to a hash function that outputs "m," which is its index into the type key object to nodes table 412. In this example, there are multiple nodes in the data structure 102 with a type value of "type1," which results in a hash collision and a list of node elements of "type1" 414. The list of nodes 414 is traversed to identify the desired node, in this case the first node 202.

For the serialization process, the master tables have to be serialized before all other tables that reference the same elements in order to ensure that the master table and its contained elements already exist before they are referenced. Due to these dependencies, the serialization order in this example begins with the GUID to key object table 402 and ends with the type key object to nodes table 412.

TABLE 1

| Binary Representation of Serialized Index | |
|---|---|
| Binary Serialization | Table |
| 2 p 2 N1 p + 1 5 type1 | GUID to key object (402) |
| 1 n p p + 1 | ID key object to node (408) |
| 1 m 1 n | Type key object to nodes (412) |

Table 1 shows the binary result of the serialization of the example index illustrated in FIG. 4. The first row of data shows the first key object 308 and key2 406 indexed in the GUID to key object table 402. Since there are two objects in the table, the row begins with the number 2. The first key object 308 is at position p having a value of length two that is "N1". It is followed directly by key2 406 at position p+1 having a value of length 5 that is "type1". The next table, ID key object to node table 408, contains only one entry at position n. Its ID key object, first key 308, is at position p in the key master table and the type key object key2 406 is at position p+1. The last table, type key object to nodes table 412, also has only one entry at position m in the main table and position 1 in the referenced list of nodes 414. The node to be expected here is at position n in the node master table, the ID key object to node table 408.

As shown in FIGS. 3 and 4, all elements refer to the key objects of the GUIDs. Standard hash tables use a key and value pair that is stored in the table. Since all indexed elements contain the key for the hash table, the key objects 308 and 406 can also be exposed by the element itself by calling a method on the element. By passing a key number, an element can return different key objects for use as keys in different hash tables. Accordingly, memory does not need to be allocated and filled when loading the index dump or adding new elements to the table.

Figure 5:
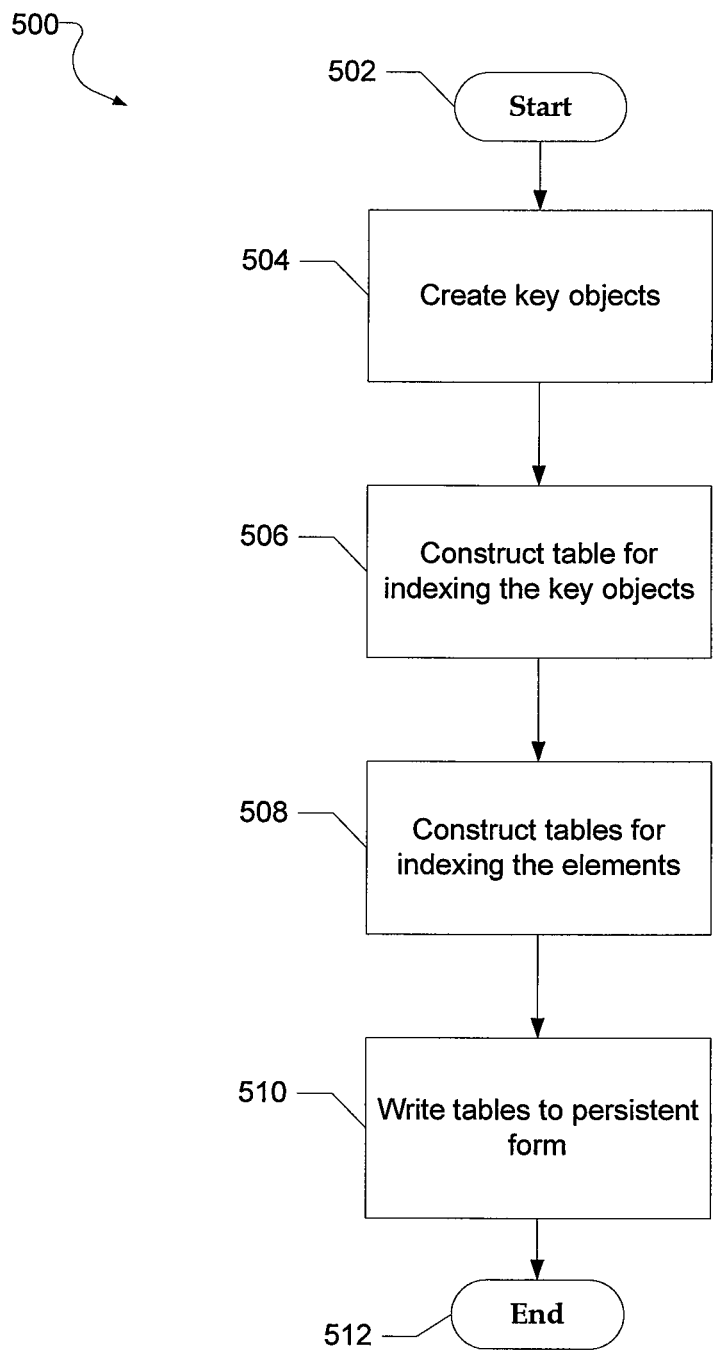
FIG. 5 is a flow chart of a method of serializing elements stored in computer memory, according to some example embodiments.

FIG. 5 is a flow chart of a method 500, according to some example embodiments, of serializing elements stored in computer memory 108. While operations of the method 500 are described below as being performed by specific components, modules or systems of the computer system 100, it will be appreciated that these operations need not necessarily be performed by the specific components identified, and could be performed by a variety of components and modules, potentially distributed over a number of machines.

The method 500 commences at operation 502 and proceeds to operation 504, where in an example embodiment, the key module 104 creates key objects to be used in index serialization. At operation 506, the index module 106 builds a GUID to key object table 402 for use as the master table for key objects. At operation 508, the index module 106 constructs tables, both master and non-master, for indexing the elements by key objects. Finally, the tables are serialized into a serialized data structure 116, which may be used as a file stream 118 or saved in persistent storage 120 at operation 510. Due to the use of master tables, the tables can be serialized into different streams. For example, master tables may be written to one stream and all other tables written to another stream. This enables incremental loading of the index where the master tables are loaded first and other hash tables may be loaded later when they are needed. The method 500 ends at operation 512.

Figure 6:
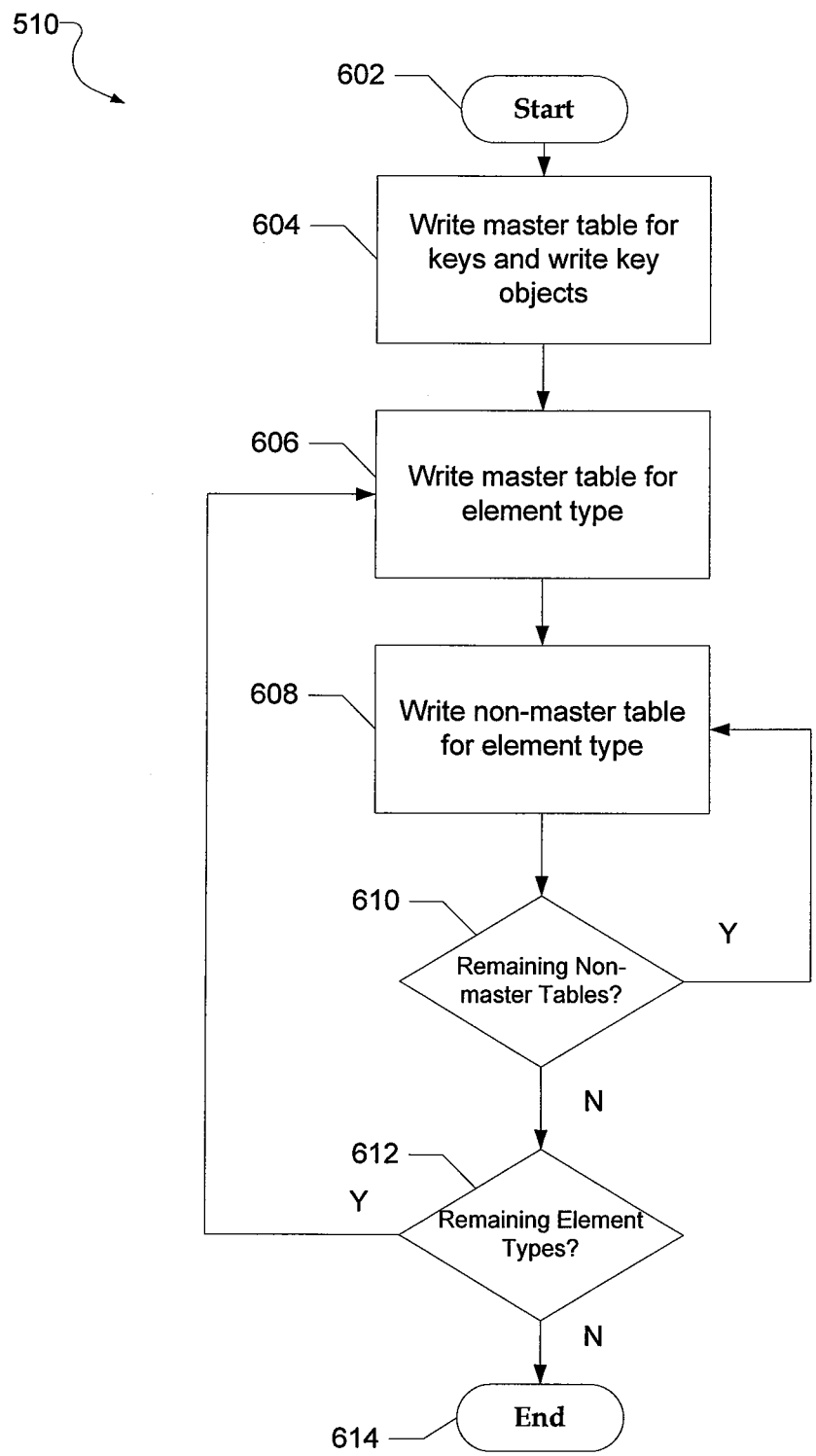
FIG. 6 is a flow chart of a method of writing tables to a persistent form, according to some example embodiments.

FIG. 6 is a detailed flow chart of operation 510, according to some example embodiments, of writing tables to a persistent form. The detailed operation 510 commences at operation 602 and proceeds to operation 604, where the write module 114 writes the master table for keys and the key objects. At operation 606, the write module 114 writes the master table for a first object type (e.g., nodes or edges), and at operation 608, a first non-master table for the object type is written. At decision 610, if there are any remaining non-master tables, operation 608 is repeated until all non-master tables have been written. At decision 612, if there are any remaining element types that have not had their tables written, operation 606 is repeated until all tables have been written. The detailed operation 510 ends at operation 614.

Figure 7:
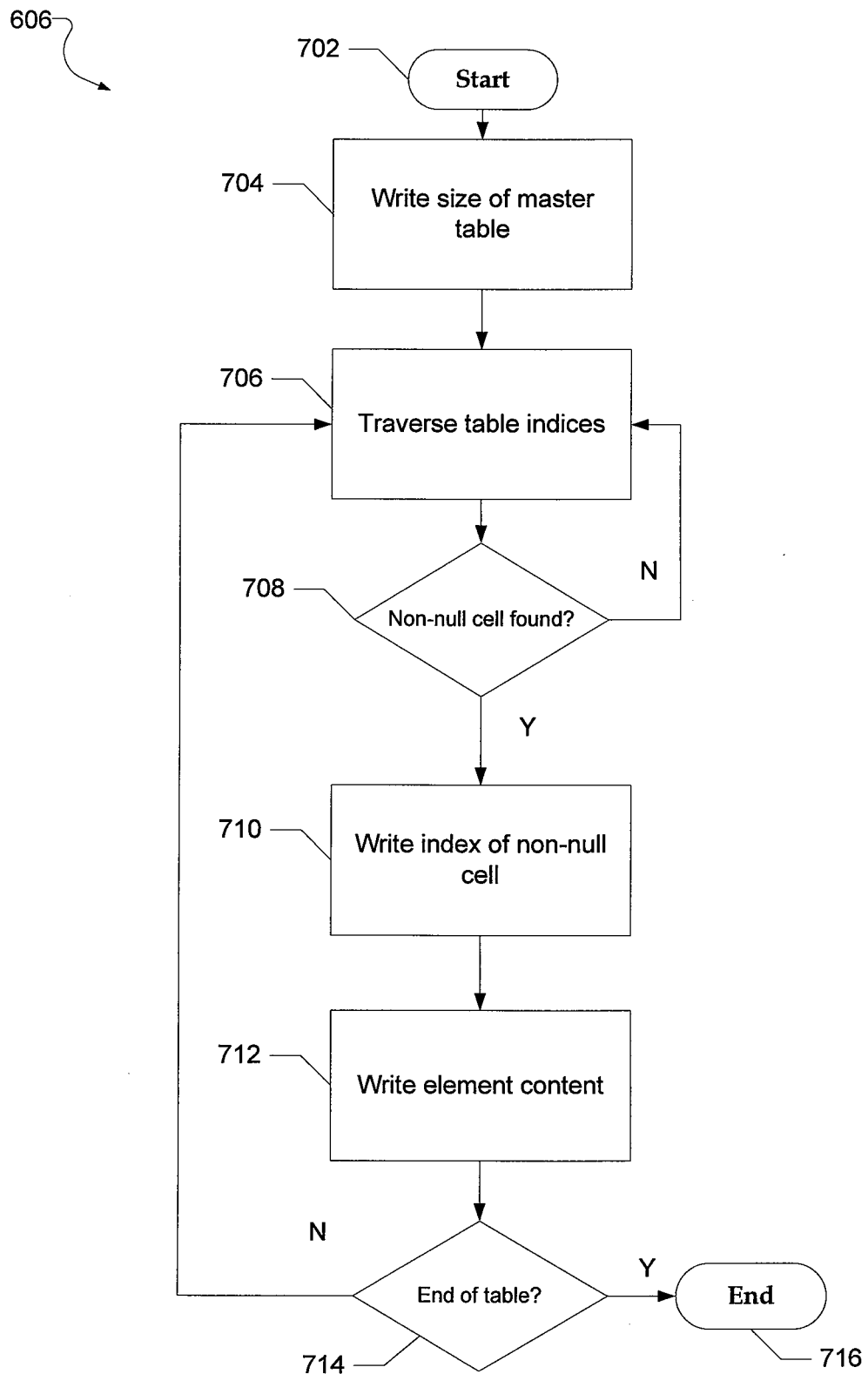
FIG. 7 is a flow chart of a method of writing master tables, according to some example embodiments.

FIG. 7 is a detailed flow chart of operation 606, according to some example embodiments, of writing the master tables. The detailed operation 606 commences at operation 702 and proceeds to operation 704 where the write module 114 first writes the size of the master table. The table indices are then traversed at operation 706, and for each non-null cell found at decision 708, the index of the non-null cell is written at operation 710. At operation 712, the write module 114 writes the element's content, which includes the index into the master table for keys of each of the element's referenced key objects. If the end of the table has been reached at decision 714, the operation ends at operation 716.

Figure 8:
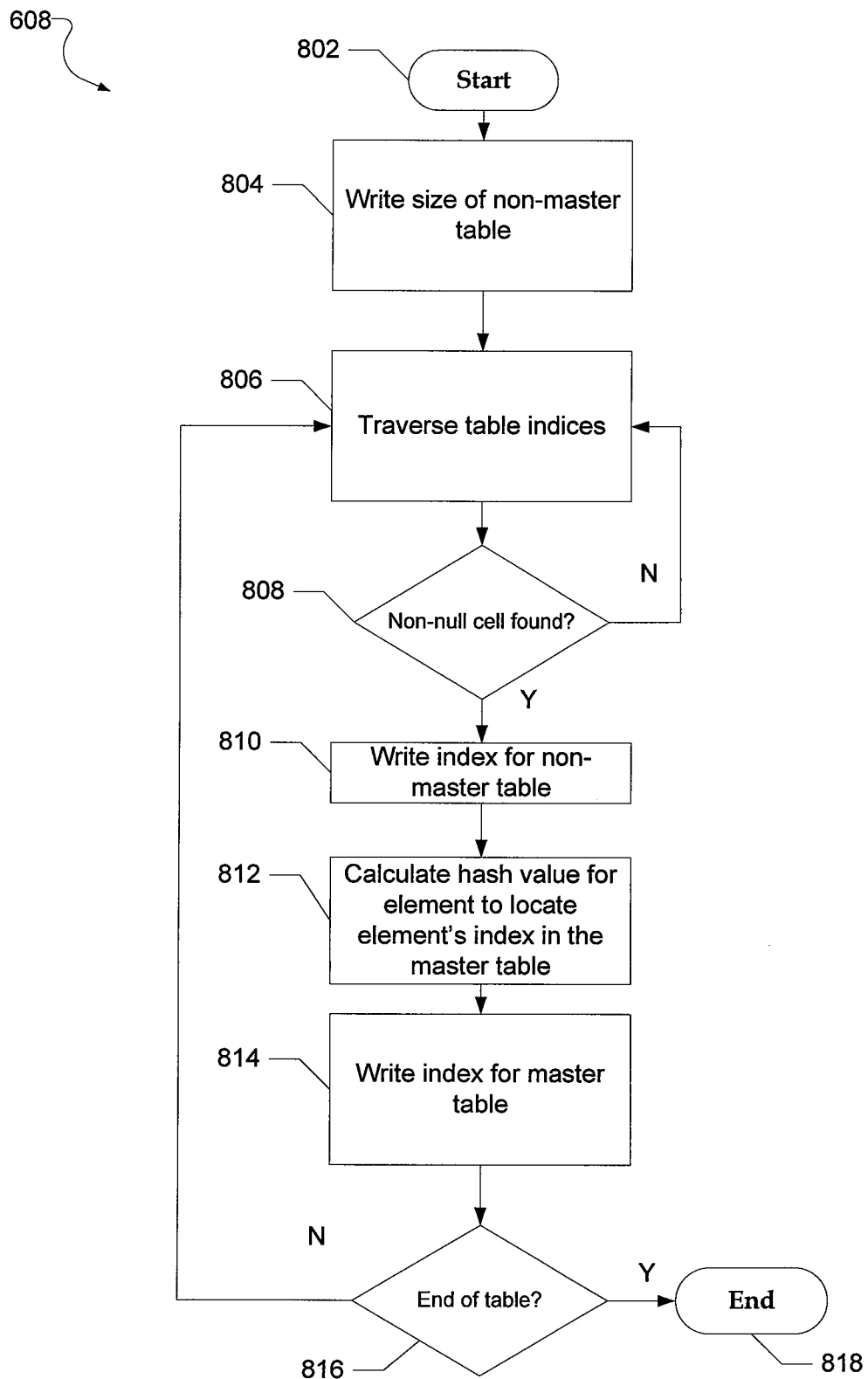
FIG. 8 is a flow chart of a method of writing secondary tables, according to some example embodiments.

FIG. 8 is a detailed flow chart of operation 608, according to some example embodiments, of writing secondary tables. The detailed operation 608 commences at operation 802 and proceeds to operation 804 where the write module 114 writes the size of the non-master table. The table indices are then traversed at operation 806, and for each non-null cell found at decision 808, the write module 114 writes the index of the non-null cell at operation 810. At operation 812, the hash value for the element is calculated in order to locate the element's index into the master table. If there are multiple elements at the same non-master table index, the position of the element in the element list is also written. At operation 814, the index into the master table is written. If the end of the table has been reached at decision 816, the operation ends at operation 818.

Figure 9:
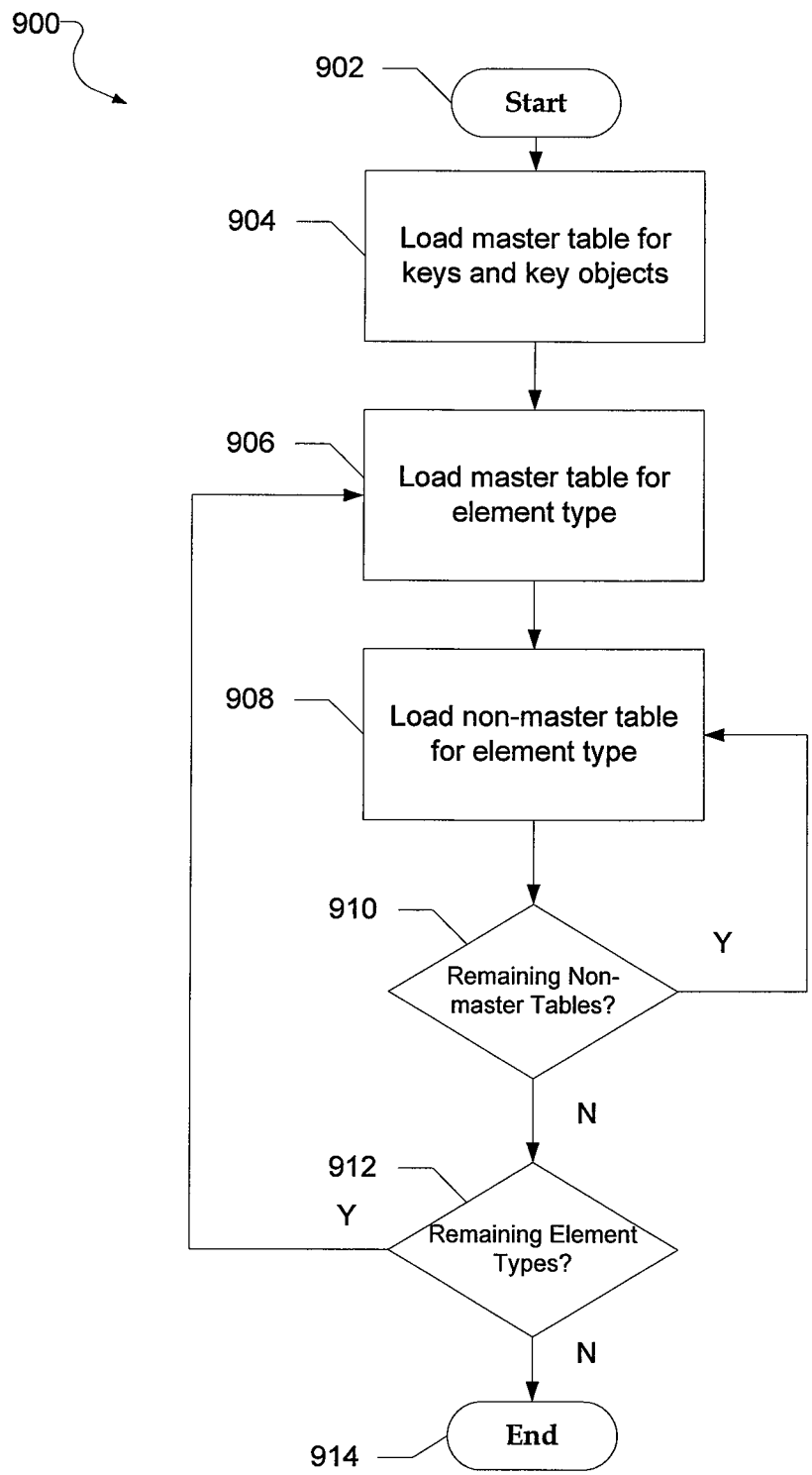
FIG. 9 is a flow chart of a method of deserializing elements that have been serialized, according to an example embodiment.

FIG. 9 is a flow chart of a method 900, according to some example embodiments, of deserializing objects that were serialized. The method 900 begins at operation 902 and proceeds to operation 904 where the master table for keys and the key objects are loaded into memory by the read module 112. At operation 906, the read module 112 loads the master table for an element type, and at operation 908, a non-master table for the element type is loaded. At decision 910, if there are no more non-master tables for the element type to load, decision 912 checks whether there are any remaining element types that need their tables loaded. If not, the method ends at operation 914.

Figure 10:
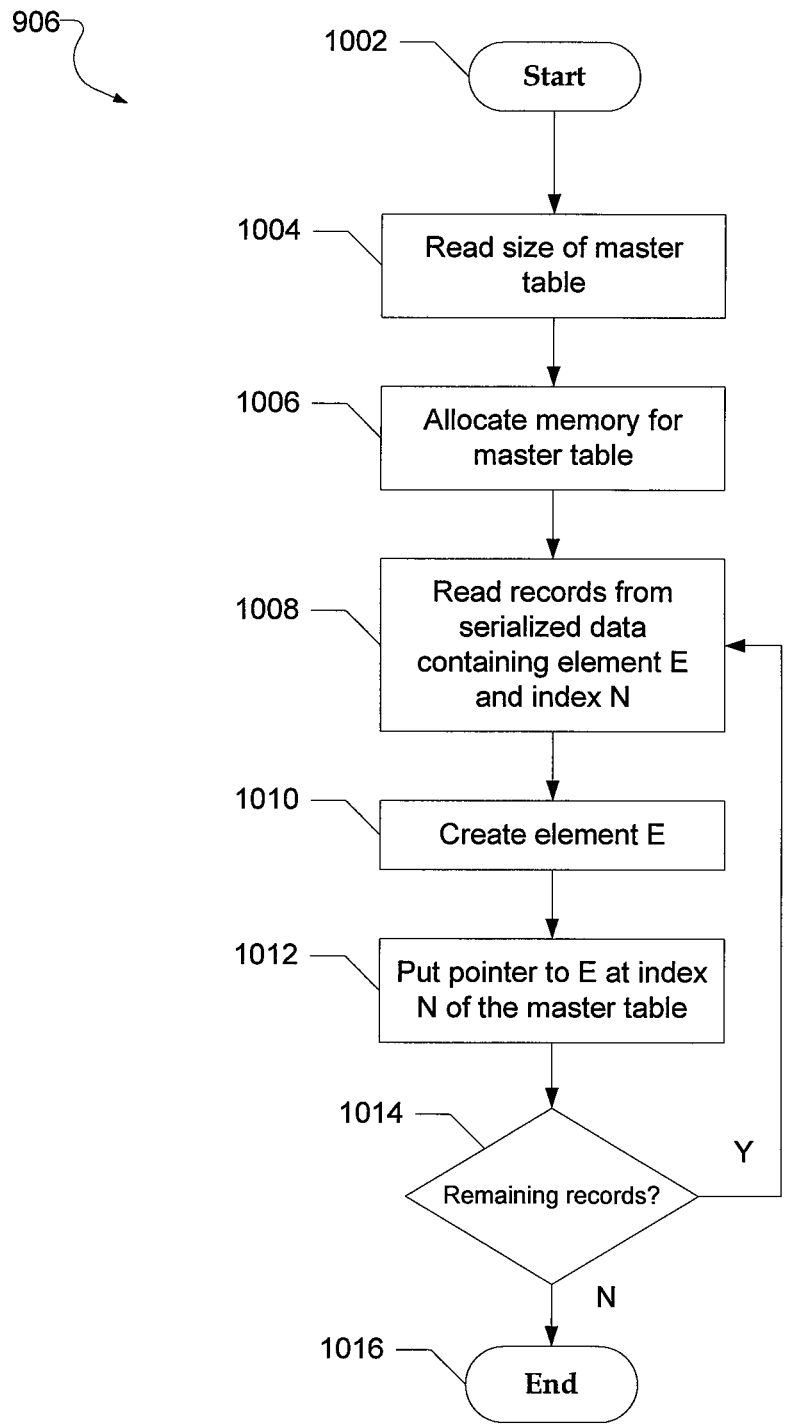
FIG. 10 is a flow chart of a method of loading master tables into memory during the deserializing process, according to some example embodiments.

FIG. 10 is a detailed flow chart of operation 906, according to some example embodiments of loading master tables into memory during the deserializing process. The detailed operation 906 begins at operation 1002 and proceeds to operation 1004, where the read module 112 reads the size of the master table from the serialized data. At operation 1006, memory is allocated for the master table. At operation 1008, the read module 112 reads element records containing the element data and an index into the master table from the serialized data. The element is created in memory at operation 1010 and a pointer to the element is placed at the index of the master table at operation 1012. If there are no remaining element records to be read at decision 1014, the operation 906 ends at operation 1016.

Figure 11:
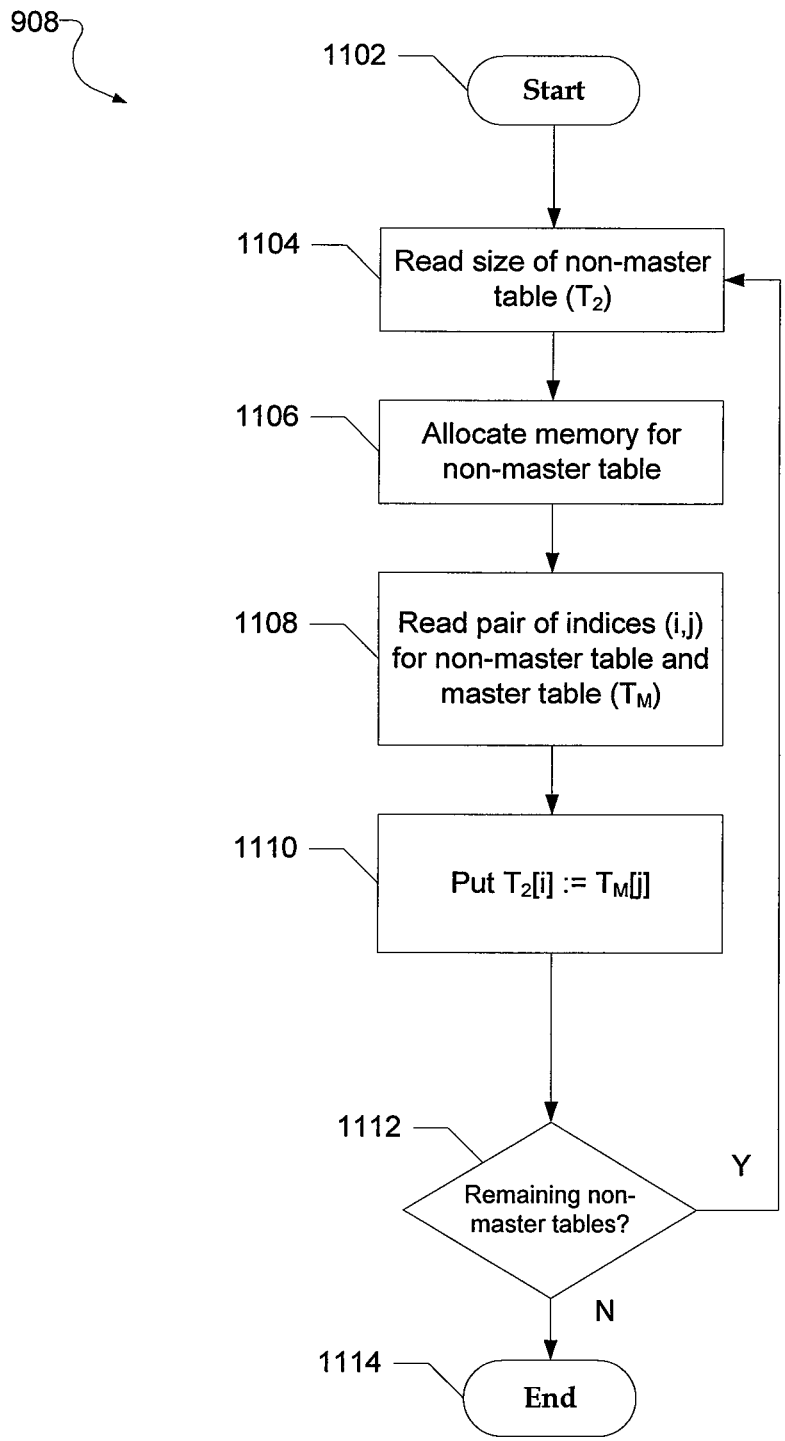
FIG. 11 is a flow chart of a method of loading secondary tables into memory during the deserialization process, according to some example embodiments.

FIG. 11 is a detailed flow chart of operation 908, according to some example embodiments, of loading secondary tables into memory during the deserialization process according to some example embodiments. The detailed operation 908 begins at operation 1102 and proceeds to operation 1104 where the read module 112 reads the size of the non-master table and allocates memory for the non-master table at operation 1106. At operation 1108, a pair of indices (i, j) representing positions in the non-master table and the master table is read. At operation 1110, the data written in the master table at index j is copied into the non-master table at index i. If there are no remaining non-master tables at decision 1112, the operation 908 ends at operation 1114.

Figure 12:
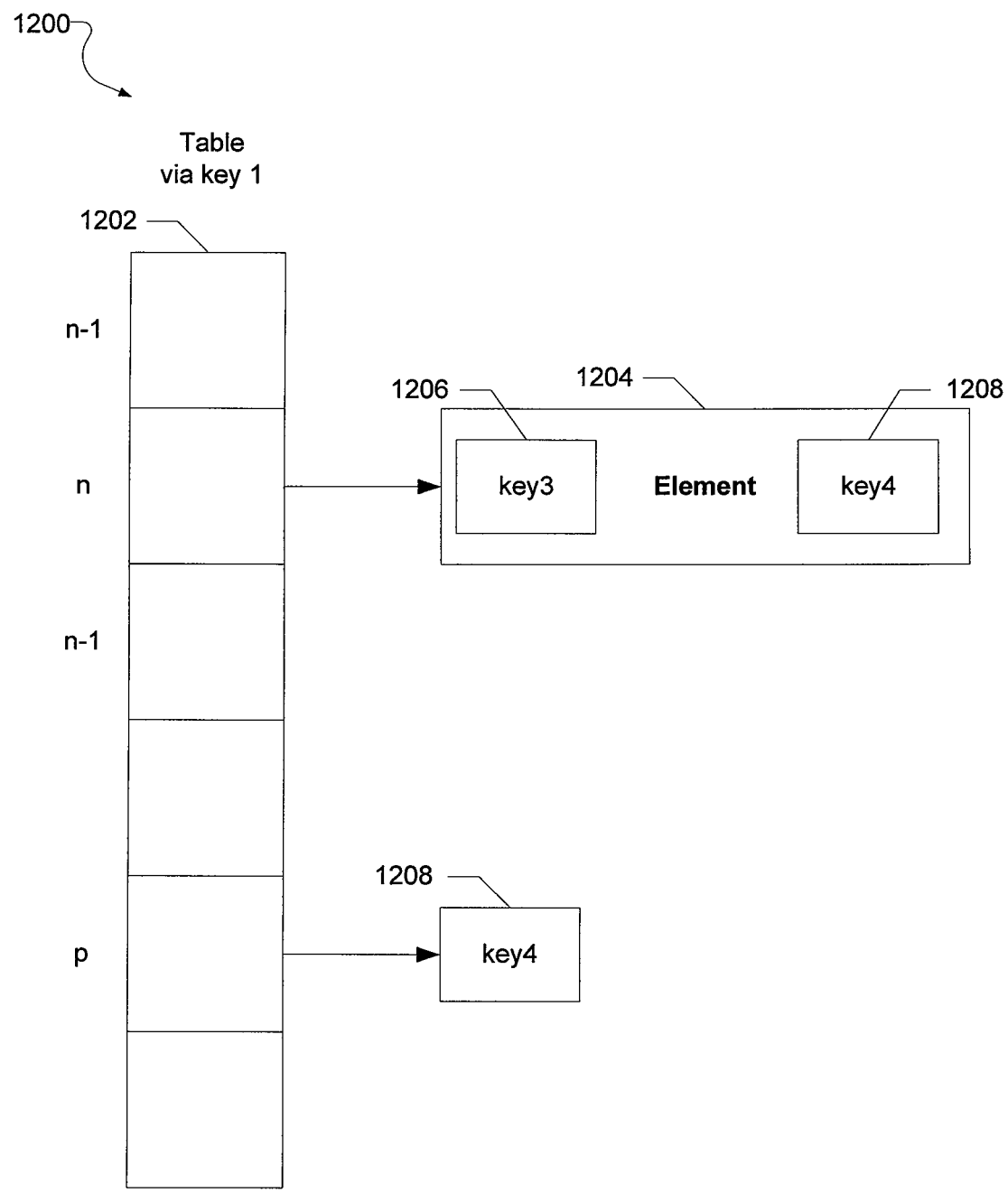
FIG. 12 is a block diagram illustrating a master table for keys integrated in an existing table that indexes elements, according to an example embodiment.

FIG. 12 is a block diagram 1200 illustrating the master table for keys integrated in an existing table 1202 that indexes elements, according to an example embodiment. The GUID to key object table 402 (see FIG. 4) can be integrated in an existing table 1202 that indexes elements. A special lookup method is required that performs a lookup for a key by comparing the GUID and the value in key objects. In this example embodiment, a dedicated table for key object lookup is not required. FIG. 12 shows a hash table 1202 that hashes via key3 1206. Key4 1208 can also be stored in the same table and gets replaced if an element 1204 is added that has a key3 1206 with the value of key4 1208. The lookup for the unique key instance is limited to this one table.

As an optimization, hexadecimal, fix-sized GUIDs can be quickly encoded into a set of numeric primitives, where one byte encodes two hexadecimal characters by mapping the 16 hex-characters to 4 bit values. This may save almost 50% of memory per key. Encoding a key first can speed up comparison during lookup in well filled tables by only comparing primitive types instead of the whole GUID string.

Example Machine Architecture and
Machine-Readable Medium

Figure 13:
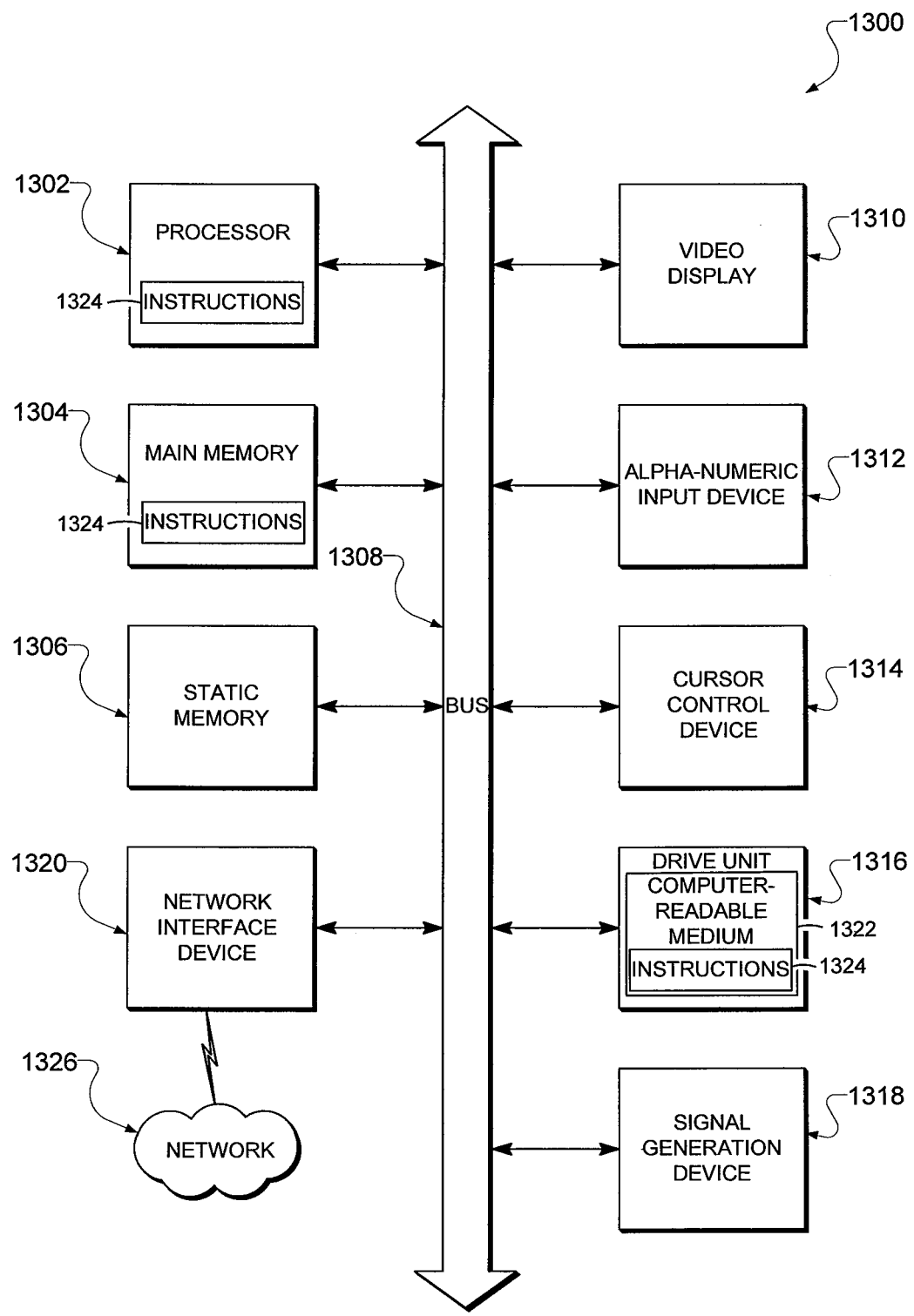
FIG. 13 is a block diagram of machine in the example form of a computer system within which set instructions for causing the machine to perform any one or more of the methodologies discussed herein may be executed.

FIG. 13 is a block diagram of a machine in the example form of a computer system 1300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or client devices in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions 1324 and data structures (e.g., software) embodying or utilized by any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Modules, Components and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software), may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Although certain specific example embodiments are described herein, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments are described and illustrated in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of serializing a plurality of elements of a linked data structure, the method comprising:
   accessing the plurality of elements, wherein the plurality of elements represent instances of a plurality of element types, and wherein each of the plurality of elements comprises a first unique identifier for the element;
   creating a first key object for each of the first unique identifiers;
   generating, using at least one hardware processor of a machine, a key object master table comprising an entry for each of the first key objects, wherein the entries for the first key objects are indexed based on the first unique identifiers;
   generating, for each element type, an element type master table comprising an entry for each element of the element type, wherein the entries of the element type master table are indexed based on the first key objects of the key object master table, and wherein each entry of the element type master table comprises an index to the key object master table corresponding to the element associated with the entry of the element type master table; and
   serializing the key object master table and the element type master tables.

2. The method of claim 1, wherein the first unique identifier for the element comprises an alphanumeric globally-unique identifier representing a name of the element.

3. The method of claim 1, further comprising:
   hashing the first unique identifiers to index the entries of the key object master table.

4. The method of claim 1, further comprising:
   hashing the first key objects to index the entries of the element type master tables.

5. The method of claim 1, wherein:
   each of the plurality of elements comprises a second identifier indicating an element sub-type of the element type of the element;
   the method further comprises creating a second key object for each of the second identifiers; and
   the key object master table further comprises an entry for each of the second key objects, wherein the entry for each second key object follows the entry for the first key object corresponding to the element associated with the second key object.

6. The method of claim 5, further comprising:
   generating, for each element type, an element sub-type non-master table comprising an entry for each element sub-type of the element type, wherein the entries of the element sub-type master table are indexed based on the second key objects of the key object master table; and
   generating a list for elements of the element sub-type, wherein each entry of the element sub-type non-master table corresponding to the element sub-type comprises an index to the list, and wherein each entry of the list comprises an index to the element type master table corresponding to an element associated with the entry of the list.

7. The method of claim 6, wherein the second identifier for the element comprises an alphanumeric identifier representing a name of the element sub-type for the element.

8. The method of claim 6, further comprising:
   hashing the second key objects to index the entries of the element sub-type non-master tables.

9. The method of claim 6, wherein the serializing of the key object master table and the element type master tables comprises serializing the key object master table, the element type master tables, the element sub-type non-master tables, and the lists.

10. The method of claim 9, wherein the serializing of the key object master table, the element type master tables, the element sub-type non-master tables, and the lists comprises:
    writing, as a series of values, information describing the key object master table; and for each of the element type master tables:
    writing, in the series of values after the information describing the key object master table, information describing the element type master table; and
    writing, in the series of values after the information describing the element type master table, information describing the element sub-type non-master table and the lists corresponding to the element type master table.

11. The method of claim 1, wherein the serializing of the key object master table and the element type master tables comprises:
    writing, as a series of values, information describing the key object master table; and
    writing, for each of the element type master tables, in the series of values after the information describing the key object master table, information describing each of the element type master tables.

12. The method of claim 1, wherein:
    the plurality of elements comprise at least one of a node and an edge of the inked data structure.

13. A method of deserializing a plurality of elements of a linked data structure stored as a plurality of tables, the method comprising:
    loading a key object master table of the plurality of tables, the key object master table comprising an entry for each of a plurality of first key objects, wherein each of the first key objects corresponds to a first unique identifier for one of the plurality of elements, wherein the plurality of elements represent instances of a plurality of element types, and wherein the entries for the first key objects are indexed based on the first unique identifiers;
    loading, for each element type, an element type master table of the plurality of tables, wherein the element type master table comprises an entry for each element of the element type, wherein the entries of the element type master table are indexed based on the first key objects of the key object master table, and wherein each entry of the element type master table comprises an index to the key object master table corresponding to the element associated with the entry of the element type master table; and for each index of each of the loaded element type master tables, creating an element having an element type corresponding to the loaded element type master table;

writing the created element with at least one value stored in the loaded key object master table corresponding to the index of the loaded element type master table; and writing, at the index of the loaded element type master table, a pointer to the created element.

14. The method of claim 13, wherein the first unique identifier for the element comprises an alphanumeric globally-unique identifier representing a name of the element.

15. The method of claim 13, wherein the entries of the key object master table are indexed based on the first unique identifiers by hashing the first unique identifiers.

16. The method of claim 13, wherein the entries of the element type master table are indexed based on the first key objects by hashing the first key objects.

17. The method of claim 13, wherein:

the loaded key object master table comprises an entry for each of a plurality of second key objects, wherein each of the second key objects corresponds to a second identifier indicating an element sub-type of the element type of an element, wherein the entry for each of the second key objects follows the entry for the first key object corresponding to the element associated with the second key object; and the method further comprises:

loading, for each element type, an element sub-type non-master table comprising an entry for each element sub-type of the element type, wherein the entries for the element sub-type non-master table are indexed based on the second key objects of the loaded key object master table;

loading a list for elements of the element sub-type, wherein each entry of the element sub-type non-master table corresponding to the element sub-type comprises an index to the list, and wherein each entry of the list comprises an index to the element type master table corresponding to an element associated with the entry of the list; and for each index of each of the loaded lists, reading, using the entry of the loaded list indicated by the index as an index to the element type master table, a pointer to an element from the element type master table; and writing, in the entry of the loaded list indicated by the index, the pointer to the element.

18. The method of claim 17, wherein the second identifier for the element comprises an alphanumeric identifier representing a name of the element sub-type for the element.

19. The method of claim 17, wherein the entries of the element sub-type non-master tables are indexed based on the second key objects by hashing the second key objects.

20. A system comprising:

at least one processor; and memory comprising modules having instructions to be executed by the at least one processor, the modules comprising:

a key module implemented by the at least one processor and configured to:

access a plurality of elements of a linked data structure, wherein the plurality of elements represent instances of a plurality of element types, and wherein each of the plurality of elements comprises a first unique identifier for the element, and create a first key object for each of the first unique identifiers;

an indexing module implemented by the at least one processor and configured to:

generate a key object master table comprising an entry for each of the first key objects, wherein the entries for the first key objects are indexed based on the first unique identifiers, and generate, for each element type, an element type master table comprising an entry for each element of the element type, wherein the entries of the element type master table are indexed based on the first key objects of the key object master table, and wherein each entry of the element type master table comprises an index to the key object master table corresponding to the element associated with the entry of the element type master table; and a serialization module implemented by the at least one processor and configured to serialize the key object master table and the element type master tables.

* * * * *